United States Patent [19]

Plester

[11] Patent Number: 4,844,796
[45] Date of Patent: Jul. 4, 1989

[54] FULL WATER TREATMENT APPARATUS FOR USE IN SOFT DRINK DISPENSING SYSTEM

[75] Inventor: George Plester, Essen, Fed. Rep. of Germany

[73] Assignee: The Coca-Cola Company, Atlanta, Ga.

[21] Appl. No.: 108,703

[22] Filed: Oct. 15, 1987

[51] Int. Cl.$^4$ .............................................. B01D 27/02
[52] U.S. Cl. ................................... 210/100; 210/180; 210/185; 210/264; 210/282; 210/283; 210/284; 210/289
[58] Field of Search ............... 210/100, 120, 180, 181, 210/185, 188, 251, 264, 282, 283, 284, 289, 290

[56] References Cited

U.S. PATENT DOCUMENTS

| | | | |
|---|---|---|---|
| 3,873,445 | 3/1975 | Bussard | 210/181 X |
| 3,974,075 | 8/1976 | Saigh et al. | 210/181 X |
| 4,066,550 | 1/1978 | Beaumont | 210/185 X |
| 4,120,787 | 10/1978 | Yargeau | 210/180 X |
| 4,483,769 | 11/1984 | Sherman | 210/282 |
| 4,606,823 | 8/1986 | Lucas, III | 210/282 |
| 4,759,474 | 7/1988 | Regunathan et al. | 210/120 X |

Primary Examiner—Tom Wyse
Attorney, Agent, or Firm—Birch, Stewart, Kolasch & Birch

[57] ABSTRACT

A water treatment apparatus for use in a post-mix beverage dispenser enables purification of water, removal of water hardness and sterilization of water which is normally accomplished by a precipitation/floculation process used in a bottling plant. This apparatus can treat the water for beverage dispensing purposes and will not require high capital expenditures. The apparatus includes a removable, disposable cartridge having a reactor or first section filled with sand, carbon granules or other heat-conducting material for removing the bicarbonate content and other impurities from the water and a filter or second section having a filter and activated carbon screen for removing solids, traces of chlorine and dissolved organic material from the water. The apparatus also includes heat exchanger coils and a heating element for raising the temperature of the water as well as a holding tank having a gas trap for collecting and removing carbon dioxide and chlorine gas. Various arrangements may also be used in the apparatus to lower the temperature of the water after it has been raised and before it reaches a downstream dispensing portion. An ion-exchange resin may also be included in the second section of the cartridge of the apparatus in order to remove nitrates, sulphates and sodium ions from the water.

11 Claims, 2 Drawing Sheets

FULL WATER TREATMENT APPARATUS FOR USE IN SOFT DRINK DISPENSING SYSTEM

FIELD OF THE INVENTION

The present invention relates to a water treatment apparatus for use in a post-mix dispenser such as soft drink dispensing systems. This apparatus uses a disposable cartridge and can treat small quantities of water for beverage dispensing purposes.

DESCRIPTION OF THE BACKGROUND ART

In a bottling plant, beverages are normally prepared using water which is treated to reduce hardness, ensure sterility, and remove suspended solids and dissolved organic matter. Precipitation methods are common and these can also reduce iron and heavy metal content of the water to some degree. Recent concerns regarding sodium and nitrate will also require additional treatment, where these components appear in the water to an unacceptable degree. In summary, water purification is an essential part of soft drink production in a bottling plant, since water is the major ingredient.

Soft drink dispensing systems using syrup also require a water supply. The water used is often from the city water mains, but does not receive full treatment. As the full water treatment technology applied in bottling plants is complex, requires careful process control, is specific to a particular water quality, and is normally not suitable for small-scale use, it has heretobefore been impossible to apply such techniques to post-mix dispensers.

Ion-exchange systems can be used in miniature form but these systems require regeneration, can be a source of micrological contamination, and only remove dissolved salts, whereas precipitation methods used in bottling plants have a much broader purification effect. More sophisticated methods, such as reverse osmosis, are also capable of application on a small-scale, but these are expensive and require considerable maintenance.

Accordingly, a need in the art exists for a simple and effective water treatment apparatus for use in a post-mix dispenser. This apparatus should be easy and inexpensive to operate as well as to manufacture. The apparatus should have the purification advantages of those found in bottling plants but should be appropriate for use in smaller dispensers. In particular, the water treating apparatus should reduce hardness, ensure sterility and remove suspended solids and dissolved organic matter from the water. Further, the device should remove sodium and nitrate from the water as well as dissolved salts. This apparatus should avoid micrological contamination and should be inexpensive and require little maintenance.

SUMMARY OF THE INVENTION

Accordingly, it is a primary object of the present invention to provide a water treatment apparatus which will be suitable for use in a post-mix beverage dispenser.

It is another object of the present invention to provide a water treatment apparatus which will treat the water to reduce hardness, ensure sterility and remove suspended solids and dissolved organic matter.

It is a further object of the present invention to provide a water treatment apparatus which will remove sodium, nitrate or dissolved salts from the water.

Another object of the present invention is to provide a water treatment apparatus which is simple, inexpensive to manufacture and requires little maintenance.

Yet another object of the present invention is to provide a water treatment apparatus which uses a reaction chamber made of simple, inexpensive materials which are disposable when spent.

These and other objects of the present invention are fulfilled by providing a water treatment apparatus for use in a post-mix beverage dispenser comprising, cartridge means for housing at least first and second sections, said first section having at least an annular portion which defines a central aperture therein, said annular portion containing a heat-conducting material, said second section containing at least a filter portion and an activated carbon screen, water input means for introducing water into said first section, heating means for increasing temperature of water introduced into said first section, said heating means being insertable into said central aperture of said first section, said increased temperature of said water causing bicarbonates contained in said water to decompose and to be precipitated and deposited onto said heat-conducting material contained in said first section, water storage means for receiving water from said first section of said cartridge means after the temperature of said water has been raised, gas collection means located in said water storage means for trapping gas produced in said first section and gas produced from said water in said storage means, said collection means preventing said gas from being redissolved into said water in order to aid purification of said water, means for removing said water from the water storage means and for introducing said water to said second section of said cartridge means, said second section thereafter removing impurities from said water in order to further purify said water, means for discharging said water from said second section and for permitting said water to move to a dispensing portion of said post-mix beverage dispenser.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
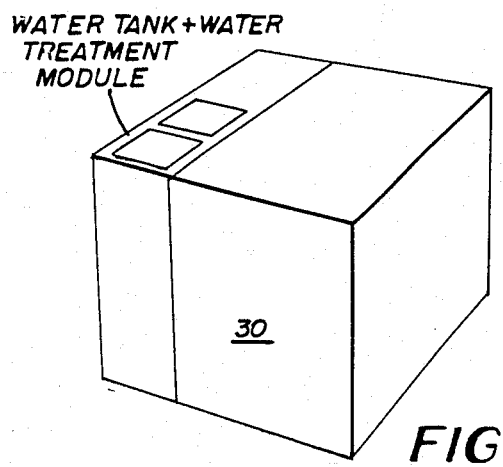
FIG. 1 is a diagramatic view of a dispenser which will use the water treatment apparatus of the present invention.

Referring in detail to the drawings and with particular reference to FIG. 1, a dispenser 30 is shown. This dispenser may be suitable for post-mix beverage dispensing or the like. It is contemplated that this dispenser 30 may be used for dispensing soft drinks which require both syrup and water. As indicated in FIG. 1, the water tank and water treatment module of the present invention may be located on a portion of dispenser 30 such that they may be easily accessed by an operator.

Figure 2:
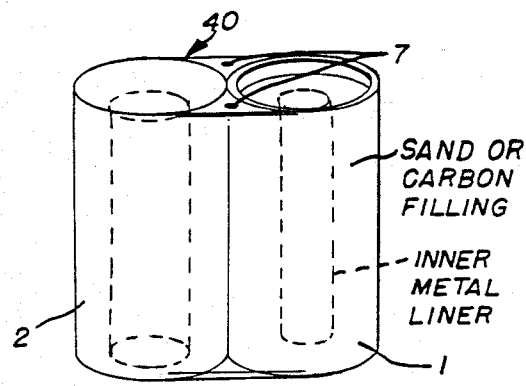
FIG. 2 is perspective view of the two-part cartridge of the present invention.
Figure 3:
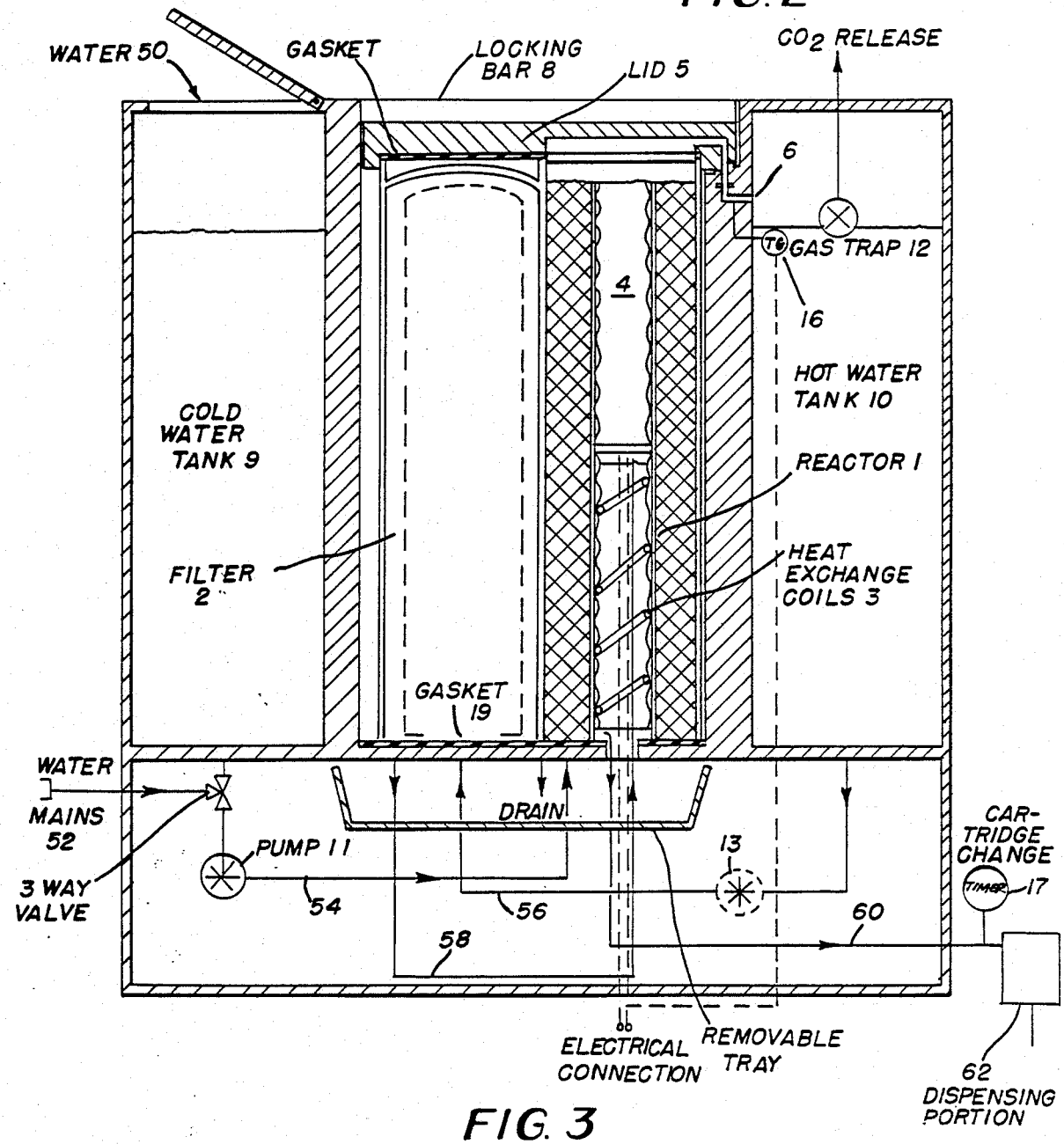
FIG. 3 is a cross-sectional view of the water treatment apparatus of the present invention.

Referring to FIG. 2, the disposable two-part cartridge of the present invention is shown. This cartridge includes a first section or reactor part 1 and a second section or filter part 2. The first section or reactor part 1 has a hollow metal core and an annular section therearound. This annular section is packed with either sand or carbon granules or any other partially or fully heat-conditioning material. The second section or filter part 2 comprises a normal filter section and an activated carbon screen. This disposable cartridge 40 may be inserted into the nondisposable water treatment device as shown in FIG. 3. While the device has been referred to as a water treatment apparatus, it should be noted that the disposable cartridge along with the nondisposable water treatment device together form the water treatment apparatus of the present invention.

Referring to FIG. 3, the nondisposable water treatment apparatus has a water storage tank 9. Water in this tank 9 is considered to be cold as it has not yet been heated. The water may be inserted into this tank 9 via the upper opening 50. This water tank 9 also has a bottom outlet (not labeled).

Water may be driven by pump 11 from this cold water tank 9 through the bottom outlet of this tank 9 to the heat exchanger 3. Alternatively, water may be drawn into the system through water mains 52. Thus, it will readily be apparent that conventional tap water is introduced the system. While this water has been treated to some extent (as is conventional with tap water), it has not yet been fully treated as it would have been in a bottling plant. As water purification is an important part of the soft drink production, further water treatment is needed.

It should be noted from FIG. 3 that the water treatment device of the present invention includes the disposable cartridge 40 which is shown with its two sections 1 and 2. This cartridge 40 may be inserted into the nondisposable portion of the water treatment apparatus and clamped into this space as indicated in FIG. 3. In particular, a gasket 19 is provided in the bottom of the nondisposable unit such that the bottom end of the cartridge may be sealed. The nondisposable unit of the present invention also includes a heat exchanger 3 with an electrical heating element 4. This heat exchanger 3 and electrical heating element 4 fit into the inner metal core of the reactor portion 1 of the disposable cartridge. This heat exchanger and electrical heater are in thermal contact with the reactor portion of the cartridge. In this arrangement, the cartridge is pressed downwardly by lid 5. This lid 5 seals the top end of the cartridge against the water channel 6 (which will be discussed in more detail hereinbelow).

As indicated in FIG. 2, locating holes 7 are provided on the disposable cartridge 40. These locating holes 7 cooperate with the lid 5 to ensure the proper placement of the cartridge. By raising the lid 5, the disposable cartridge 40 may be removed from the nondisposable unit simply by lifting the cartridge out of the unit. To place a new cartridge into the unit, it is simply necessary to reinsert this new cartridge into the nondisposable unit and to close lid 5. A locking bar 8 is provided in order to ensure closing of lid 5.

As set forth above, water will be moved by pump 11 from water storage tank 9 or water main 52 to the base of the first section or reactor. Water will thus move through conduit 54 into the lower portion of the first section or reactor 1 of the disposable cartridge unit 40. As water moves up through this cartridge unit, it will first be heated by heat exchange coils 3 and then by the electric heating element 4 located above these coils 3. The water will travel through the first section of the disposable cartridge unit 40 and will exit this annular space through water channel 6. Accordingly, as water passes through the first section or reactor 1 of the disposable cartridge 40, its temperature is raised.

The effective rise in the temperature is to permit the bicarbonate content of the water to be removed. In particular, the bicarbonate content of the water begins to decompose when the temperature rises and thereafter carbonates will be precipitated into the granules or other heat-conducting material contained in the first section or reactor 1. The process is accelerated and completed at the top section of the reactor where the granules are heated by the electric heating element 4. As precipitation occurs, other impurities are also removed by the fine precipitate and deposited onto the granules.

As the hot water exits the first section or reactor 1 of the disposable cartridge 40, it will travel through water channel 6 to a holding tank 10. This holding tank has an air head-space which is pressurized by the water pump 11 discharge. In this air head-space, a gas release trap 12 is located. This gas-release trap 12 will capture carbon dioxide generated in the reactor and chlorine escaping from the heated water. These gases are collected in the head space and are intermittently released by the gas trap 12. Alternatively, the air head-space can be maintained at atmospheric pressure by introducing a pump 13 after the hot water tank. This pump 13 is optional and it may act to control the level of the water in the tank 10. This arrangement may permit a lower pressure to be maintained in the air head-space such that acceleration of the decomposition of bicarbonate and the removal of carbon dioxide can be achieved.

As the water leaves holding tank 10, it will travel through conduit 56 to the lower portion of the second section or filter 2 of the disposable cartridge 40. The water from tank 10 will be drawn therefrom such that sufficient time is permitted for water to be sterilized within the tank. The water which flows through the second section or filter 2 will interact with the filter section and activated carbon screen contained within this section. This second section or filter 2 removes solids and any remaining traces of chlorine as well as dissolved organic material remaining in the water.

As seen in FIG. 3, the water may then be drawn from the second section or filter 2 by conduit 58 and then pass through the heat-exchange section 3 of the first section or reactor core. This water will therefore be cooled by the water which is incoming through conduit 54 into the first section or reactor of the disposable cartridge 40. Accordingly, the water drawn in through conduit 58 to the heat exchange coils 3 may then be discharged through conduit 60. This water will have been cooled and may flow from the water treatment apparatus to a downstream dispensing portion 62 for the dispenser 30. This dispensing portion 62 has merely been indicated as a block diagram arrangement in the FIG. 3 arrangement. It should be clear to one of ordinary skill in the art that various dispensing arrangements may be incorporated into the dispenser 30.

Figure 4:
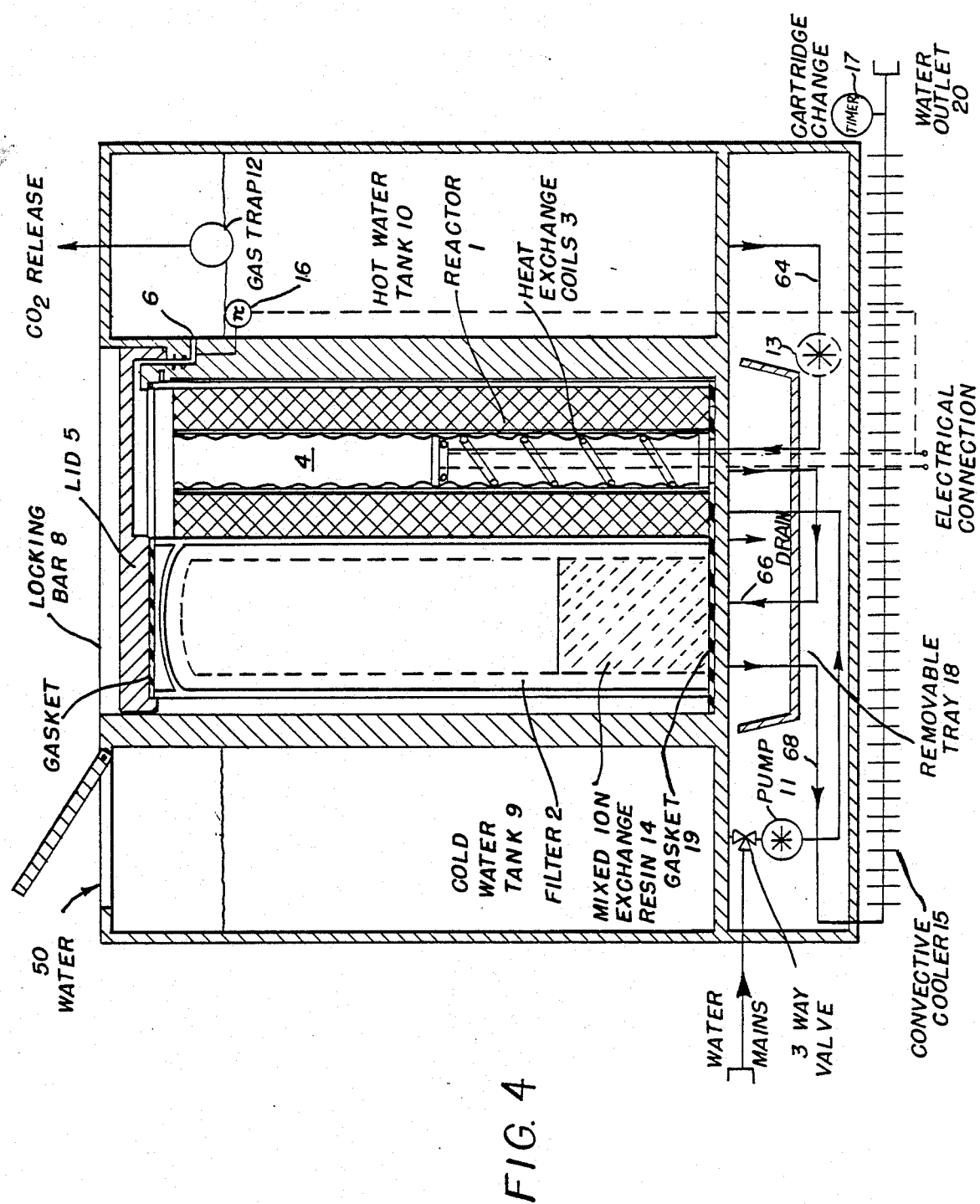
FIG. 4 is a cross-sectional view of a second embodiment of the water treating apparatus of the present invention.

As an alternative to the FIG. 3 arrangement, the FIG. 4 embodiment may be used. This FIG. 4 embodiment differs from the FIG. 3 embodiment in that water removed from the water holding tank 10 will first travel through conduit 64 to the heat exchange coils 3. This arrangement again allows the water to be cooled to a temperature such that downstream operations of the water treatment apparatus will not be adversely affected. From the heat exchange coils 3, the water may travel through conduit 66 to the second section or filter 2 of the disposable cartridge 40.

This second section or filter 2 of the disposable cartridge 40 has a mixed ion-exchange resin 14 contained therein. This resin 14 will partially remove nitrates, sulfates and sodium ions from the water. As the water first passes through the heat exchange coils and is cooled in temperature before contacting this resin 14, damage to the resin is avoided. After water passes through the second section or filter 2, it will be discharged through conduit 68. As the water travels through this conduit, it will pass through an air-cooled section 15. This air-cooled section 15 further reduces the temperature of the water prior to feeding it to the downstream dispensing portion.

In summary, the water treatment apparatus of the present invention removes hardness and some metal impurities from the water. The bulk of any chlorine is also stripped and removed in the holding tank 10. The holding tank 10 ensures sterilization of the water. Further, the second section or filter 2 of the disposable cartridge 40 provides for removal of suspending solids and dissolved hydrocarbons in the water. When it is necessary, limited ion exchange for sulfates, nitrates and sodium can be included in the water treatment apparatus of the instant invention as shown in the FIG. 4 embodiment. A mixed ion exchange resin 14 is needed in such an arrangement as these components cannot be removed by a less sophisticated means.

Heat recouperation in the instant device ensures a reasonable energy utilization of the device. Further, the electrical heating element 4 of the instant invention is set by a control 16 such that an adequate temperature may be maintained in the head-space above the first section or reactor 1 of the disposable cartridge 40.

Additionally, as seen in FIGS. 3 and 4, a timer 17 may be provided in the device of the instant invention. This timer 17 is actuated by operation of the dispenser valves (not shown) and will measure actual dispensing hours or amount of water dispensed. If actual dispensing hours are measured, the timer may then determine the volume of water treated. After a predetermined amount of water has been dispensed by this device, the timer will provide a warning signal so that a user will be notified that the disposable cartridge 40 should be replaced. After a critical time has elapsed, the timer 17 will provide for cutting-off the operation of water pump 11 such that the water treatment apparatus is inoperable. The apparatus may be reactuated by replacement of the spent cartridge 40 with a new cartridge.

When the cartridge is replaced, residual water remaining in the cartridge chamber may be drained into sump tray 18. This tray 18 is located below the chamber in which the disposable cartridge 40 is located and is normally covered by this cartridge. This drain will be opened only after the disposable cartridge 40 has been removed.

The apparatus of the present invention will reduce water hardness while ensuring water sterility and removing water impurities which are not normally removed by conventional post-mix dispensers. Such purification of water has heretobefore only been attainable in bottling plant arrangements. However, the device of the instant invention avoids the use of large and complicated arrangements which have been used in bottling plant arrangements and thus may be used in small dispensing devices.

The device of the instant invention requires no process control apart from a thermostat and thus is relatively simple to maintain and operate. Further, as the disposable cartridge 40 is relatively simple and as the nondisposable components of the apparatus require little maintenance, the device is relatively inexpensive to manufacture and to maintain but will permit desired treatment of water. Accordingly, this device can economically treat small quantities of water for beverage dispensing purposes without entailing high capital expenditures. This device will be effective for a wide range of water quality without requiring adjustments thereto.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A water treatment apparatus for use in a post-mix beverage dispenser comprising:
   cartridge means for housing at least first and second sections, said first section having at least an annular portion which defines a central aperture therein, said annular portion containing a heat-conducting material, said second section containing at least a filter portion and an activated carbon screen;
   water input means for introducing water into said first section;
   heating means for increasing temperature of water introduced into said first section, said heating means being insertable into said central aperture of said first section, said increased temperature of said water causing bicarbonates contained in said water to decompose and to be precipitated and deposited onto said heat-conducting material contained in said first section;
   water storage means for receiving water from said first section of said cartridge means after the temperature of said water has been raised;
   gas collection means located in said water storage means for trapping gas produced in said first section and gas produced from said water in said storage means, said collection means preventing said gas from being redissolved into said water in order to aid purification of said water;
   means for removing said water from the water storage means and for introducing said water to said second section of said cartridge means, said second section thereafter removing impurities from said water in order to further purify said water;

means for discharging said water from said second section and for permitting said water to move to a dispensing portion of said post-mix beverage dispenser.

2. The water treatment apparatus as recited in claim 1, wherein said means for discharging further comprises conduit means between said second section and first section and between said first section and dispensing portion for supplying said water to said heating means and then to said dispensing portion, said water being cooled while flowing through said heating means due to an association of the heating means with the first section of the cartridge means such that the water being introduced to said first section by said water input means is at a temperature lower than said water in said heating means and this difference in temperature acts to cool said water in said heating means.

3. The water treatment apparatus as recited in claim 1, wherein said means for removing comprises a first conduit which first supplies said water to said heating means and a second conduit which then conducts said water from said heating means to said second section of said cartridge means, said water being cooled while flowing through said heating means due to an association of the heating means with the first section of the cartridge means such that the water being introduced to said first section by said water input means is at a temperature lower than said water in said heating means and this difference in temperature acts to cool said water in said heating means.

4. The water treatment apparatus as recited in claim 3, further comprising an ion-exchange resin located within said second section of said cartridge means, said resin contacting said water in said second section and acting to remove at least one of nitrate, sulphate and sodium ions in said water.

5. The water treatment apparatus as recited in claim 4, wherein said means for discharging further comprises an air-cooled section connected between said second section and said dispensing portion, the water passes through the air-cooled section after leaving said second section and before reaching said dispensing portion, said air-cooled section reducing the temperature of the water passing therethrough.

6. The water treatment apparatus as recited in claim 1, wherein said first section of said cartridge means acts to remove at least bicarbonate content of the water as well as other impurities and wherein said heat-conducting material contains a member selected from the group consisting of sand granules and carbon granules.

7. The water treatment apparatus as recited in claim 1, wherein said gas collection means comprises a gas release trap located in an air head-space within said water storage means, said gas collected by said gas release trap includes at least one of carbon dioxide and chlorine.

8. The water treatment apparatus as recited in claim 1, wherein said water storage means includes an air head-space in which said gas collection means is located, said water treatment apparatus further comprising a pump for maintaining pressure in the air head-space of said water storage means and for controlling a level of the water within said water storage means.

9. The water treatment apparatus as recited in claim 1, wherein said filter portion and activated carbon screen of said second section of said cartridge means act to remove at least one of solids, chlorine and dissolved organic matter from the water, said second section of said cartridge means being located adjacent said first section of said cartridge means.

10. The water treatment apparatus as recited in claim 1, wherein said cartridge means is readily removable from said apparatus.

11. The water treatment apparatus as recited in claim 10, wherein said cartridge means is disposable and further including control means for monitoring the amount of water treated by the apparatus and for preventing operation of the apparatus after a predetermined amount of water has been treated until said cartridge means in said apparatus is replaced by a new cartridge means.

* * * * *